(12) United States Patent
Goto et al.

(10) Patent No.: US 11,286,384 B2
(45) Date of Patent: Mar. 29, 2022

(54) RESIN COMPOSITION, MOLDED ARTICLE, LAMINATE, GAS BARRIER MATERIAL, COATING MATERIAL, AND ADHESIVE

(71) Applicants: DIC Corporation, Tokyo (JP); National Institute of Advanced Industrial Science and Technology, Tokyo (JP)

(72) Inventors: Yusaku Goto, Sakura (JP); Tomoki Dohi, Sakura (JP); Michiya Nakashima, Sakura (JP); Yusho Usami, Sakura (JP); Takeo Ebina, Sendai (JP); Ryo Ishii, Sendai (JP); Takafumi Aizawa, Sendai (JP)

(73) Assignees: DIC Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 293 days.

(21) Appl. No.: 16/489,796

(22) PCT Filed: Mar. 14, 2018

(86) PCT No.: PCT/JP2018/010023
§ 371 (c)(1),
(2) Date: Aug. 29, 2019

(87) PCT Pub. No.: WO2018/168947
PCT Pub. Date: Sep. 20, 2018

(65) Prior Publication Data
US 2020/0002527 A1 Jan. 2, 2020

(30) Foreign Application Priority Data
Mar. 14, 2017 (JP) .............................. JP2017-048866

(51) Int. Cl.
| | |
|---|---|
| *C08L 57/10* | (2006.01) |
| *C08K 3/34* | (2006.01) |
| *C08K 9/02* | (2006.01) |
| *C09D 157/10* | (2006.01) |
| *C09J 157/10* | (2006.01) |

(52) U.S. Cl.
CPC .............. *C08L 57/10* (2013.01); *C08K 3/346* (2013.01); *C08K 9/02* (2013.01); *C08L 2201/14* (2013.01); *C08L 2203/16* (2013.01); *C08L 2203/20* (2013.01); *C09D 157/10* (2013.01); *C09J 157/10* (2013.01)

(58) Field of Classification Search
CPC .............. C08L 57/10; C08K 3/34; C08K 9/02
USPC ........................................................ 524/445
See application file for complete search history.

(56) References Cited

U.S. PATENT DOCUMENTS 3,671,190 A * 6/1972 Nuemann ............. C01B 33/405
423/331

FOREIGN PATENT DOCUMENTS

| | | | |
|---|---|---|---|
| BR | PI0901987 A2 * | 3/2011 | |
| CN | 102448884 A | 5/2012 | |
| JP | 2004-059768 A | 2/2004 | |
| JP | 2007-277078 A | 10/2007 | |
| JP | 2012-121777 A | 6/2012 | |
| JP | 2012-148946 A | 8/2012 | |
| JP | 5099412 B2 * | 12/2012 | |
| JP | 2017-031015 A | 2/2017 | |
| JP | 2017-105991 A | 6/2017 | |
| WO | 2010/147147 A1 | 12/2010 | |
| WO | 2013/027609 A1 | 2/2013 | |

OTHER PUBLICATIONS

International Preliminary Report on Patentability (IPRP) dated Sep. 26, 2019, issued for PCT/JP2018/010023.
Georgios A. Choudalakis et al., "CO2 Gas Barrier Properties in Polymer Nanocomposite Coating Containing Li-Hectorite Clays", J. Appl. Polym. Sci., No. 131, 2014, pp. 40805 (1-12). (cited in the May 25, 2021 Office Action issued for CN Patent Application No. 201880008171.5).
International Search Report dated May 29, 2018, issued for PCT/JP2018/010023.

* cited by examiner

Primary Examiner — Deve V Hall
(74) Attorney, Agent, or Firm — Locke Lord LLP; James E. Armstrong, IV; Nicholas J. DiCeglie, Jr.

(57) ABSTRACT

The present invention, in an aspect, provides a resin composition that contains a vinyl polymer and a smectite with partially immobilized lithium.

17 Claims, No Drawings

RESIN COMPOSITION, MOLDED ARTICLE, LAMINATE, GAS BARRIER MATERIAL, COATING MATERIAL, AND ADHESIVE

TECHNICAL FIELD

The present invention relates to a resin composition, a molded article, a laminate, a gas barrier material, a coating material, and an adhesive.

BACKGROUND ART

Packaging materials used to package food or similar things are required to have functions such as the protection of their contents, retort resistance, heat resistance, transparency, and workability. To keep the contents in good condition, gas barrier properties are particularly important. Recently, not only packaging materials but also materials for electronic materials, including solar cells and semiconductors, have become required to have high gas barrier properties.

In PTL 1, it is described that combining a resin having a hydroxyl group and an isocyanate compound with a sheet inorganic compound, such as a clay mineral, and a light-screening agent improves gas barrier and other characteristics.

PTL 2, moreover, describes a material that is primarily modified clay. According to PTL 2, the use of modified clay, optionally with additives, and arraying crystals of the modified clay into dense layers gives a film material that has a mechanical strength high enough that the material can be used as a self-supporting membrane, gas barrier properties, waterproofness, heat stability, and flexibility.

CITATION LIST

Patent Literature

PTL 1: International Publication No. 2013/027609
PTL 2: Japanese Unexamined Patent Application Publication No. 2007-277078

SUMMARY OF INVENTION

Technical Problem

Sheet inorganic compounds of the type described in PTL 1 are bulky, and with such a compound, it is difficult to achieve good compatibility with resins. This means there is a limit to how much such a compound can be added and to its dispersibility. It is therefore difficult to achieve even higher gas barrier properties by adding more of such a compound, and even if it were possible to increase the amount of filler added, dispersibility could not be sufficient, and the gas barrier properties could not be sufficient.

As for the clay membrane described in PTL 2, the substrate on which the viscosity membrane is formed (e.g., a resin substrate) is required to have very high heat resistance because the membrane is made into a self-supporting membrane by heating after its formation. Usable only with a substrate having very high heat resistance (e.g., a resin substrate), therefore, the viscosity membrane described in PTL 2 has the disadvantage of limited use. Furthermore, the self-supporting membrane described in PTL 2 contains much filler so that it will exhibit high gas barrier properties. Too much filler, however, causes the disadvantage, for example if the membrane is used in film applications for soft packaging, of a lack of flexibility of the film because the filler affects the softness of the composition. For this reason, there remains a need for a resin composition that exhibits high barrier properties regardless of whether it has a high or low filler content.

An object of the present invention is therefore to provide a resin composition even better than existing resin compositions in gas barrier properties, in particular water vapor and oxygen barrier properties.

Solution to Problem

The inventors found that a smectite with partially immobilized lithium, obtained through prior heat treatment, exhibits improved dispersibility in resins, helps prevent the deterioration of the resin used therewith, and can be adapted to a wide range of resins and, as a consequence of these and other reasons, is suitable for use as a filler in a resin composition superior in gas barrier properties. Combining this smectite with partially immobilized lithium with a vinyl polymer, moreover, results in excellent gas barrier properties. Based on these findings, the inventors completed the present invention.

That is, a resin composition according to an aspect of the present invention contains a vinyl polymer and a smectite with partially immobilized lithium. By virtue of the combination of a vinyl polymer with a smectite with partially immobilized lithium, this resin composition gives a resin film superior in gas barrier properties, such as water vapor and oxygen barrier properties (e.g., oxygen barrier properties under high-humidity conditions).

The vinyl polymer may include at least one selected from the group consisting of a hydroxyl group and a carboxyl group and preferably has a structural unit represented by formula (1) below.

[Chem. 1]

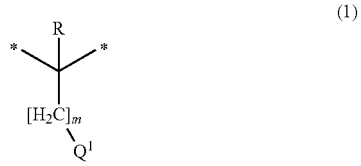

[In formula (1), R represents a C1-2 alkyl group, $12^1$ represents a hydroxyl or carboxyl group, m represents 0 or 1, and * represents a bond.]

The smectite with partially immobilized lithium preferably has a cation exchange capacity of 1 to 70 meq/100 g. This makes the resin composition even better in water vapor and oxygen barrier properties.

The smectite with partially immobilized lithium is preferably present in an amount of 3% to 50% by mass based on the total nonvolatile content of the resin composition. Such an amount results in a resin composition even better in formability as well as superior in water vapor and oxygen barrier properties.

The resin composition according to an aspect of the present invention is suitable for use as a resin composition for gas barrier purposes by virtue of being superior in water vapor and oxygen barrier properties.

The present invention further provides an article molded from a resin composition as described above and a laminate having this molded article on a substrate (laminate including a substrate and a molded article on the substrate).

The resin composition according to an aspect of the present invention is suitable for use in applications such as coating materials, gas barrier materials, and adhesives by virtue of being superior in water vapor and oxygen barrier properties.

Advantageous Effects of Invention

The present invention makes it possible to provide a resin composition even better in gas barrier properties, in particular water vapor and oxygen barrier properties.

DESCRIPTION OF EMBODIMENTS

The following describes preferred embodiments of the present invention in detail. The present invention, however, is not limited to these embodiments.
<Resin Composition>
A resin composition according to an embodiment contains a vinyl polymer and a smectite with partially immobilized lithium.
(Smectite with Partially Immobilized Lithium)
Smectite is a kind of sheet-structured phyllosilicate mineral (sheet clay mineral). Known specific structures of smectite include montmorillonite, beidellite, saponite, hectorite, stevensite, and sauconite. Of these, as the structure(s) of a clay material, at least one structure selected from the group consisting of montmorillonite and stevensite is preferred. In these structures, a metal element in octahedral sheets has been partially replaced, for example with a lower-valency metal element resulting from isomorphous substitution or with a defect. The octahedral sheets are therefore negatively charged. As a consequence, these structures have vacant sites in their octahedral sheets, and in smectites having these structures, as discussed hereinafter, lithium ions can exist stably after movement.

A smectite in which the retained cation is the lithium ion is referred to as a lithium smectite (Smectites with partially immobilized lithium as described hereinafter are excluded.). An example of a method for exchanging a cation in a smectite with the lithium ion is a cation exchange by adding a lithium salt, such as lithium hydroxide or lithium chloride, to a liquid dispersion (dispersion slurry) of a natural sodium smectite. By controlling the amount of lithium added to the liquid dispersion, the quantity of lithium ions in the cation leaching from the resulting lithium smectite can be controlled to an appropriate level. A lithium smectite can alternatively be obtained by a column or batch process that uses a cation-exchange resin that retains lithium ions as a result of ion exchange.

In an embodiment, smectite with partially immobilized lithium refers to a lithium smectite in which a subset of the lithium ions are immobilized in vacant sites in the octahedral sheets. A smectite with partially immobilized lithium is obtained as a result of the immobilization of interlayer lithium ions into vacant sites in the octahedral sheets, for example through the heating of a lithium smectite. The immobilization of lithium ions makes the smectite waterproof.

The temperature conditions for the heating for the partial immobilization of lithium are not critical as long as lithium ions can be immobilized. As discussed hereinafter, a small cation exchange capacity (CEC) will lead to a greater improvement in the water vapor and oxygen barrier properties of the resin composition containing the smectite with partially immobilized lithium. It is therefore preferred to heat the lithium smectite at 150° C. or above so that the heating will immobilize lithium ions efficiently and thereby reduce the cation exchange capacity greatly. The temperature for the heating is more preferably between 150° C. and 600° C., even more preferably between 180° C. and 600° C., in particular between 200° C. and 500° C., the most preferably between 250° C. and 500° C. Heating at such temperatures ensures higher efficiency in reducing the cation exchange capacity and, at the same time, helps prevent events such as the dehydration of hydroxyl groups in the smectite. The heating is performed preferably in an open electric furnace. This ensures that the relative humidity is 5% or less and the pressure is atmospheric pressure during heating. The duration of the heating is not critical as long as lithium can be partially immobilized, but preferably is between 0.5 and 48 hours, more preferably between 1 and 24 hours, in light of production efficiency.

Whether the resultant substance is a smectite with partially immobilized lithium or not can be determined by x-ray photoelectron spectroscopy (XPS). Specifically, in the XPS spectrum measured by XPS, the position of the binding energy peak attributable to the Li ion is checked. For example, if the smectite is montmorillonite, changing the lithium smectite into a smectite with partially immobilized lithium, for example by heating, will shift the position of the binding energy peak attributable to the Li ion in the XPS spectrum from 57.0 ev to 55.4 ev. If the smectite is montmorillonite, therefore, whether the spectrum has a 55.4-ev binding energy peak is the criterion for whether the smectite is a partially immobilized type or not.

The cation exchange capacity of the smectite with partially immobilized lithium is preferably 70 meq/100 g or less, more preferably 60 meq/100 g or less so that the resin composition will be even better in water vapor and oxygen barrier properties (e.g., oxygen barrier properties under high-humidity conditions). The cation exchange capacity of the smectite with partially immobilized lithium is 1 meg/100 g or more, more preferably 5 meq/100 g or more, even more preferably 10 meq/100 g or more so that the resin composition will be even better in water vapor and oxygen barrier properties (e.g., oxygen barrier properties under high-humidity conditions). In light of these, the cation exchange capacity of the smectite with partially immobilized lithium is between 1 and 70 meq/100 g, more preferably between 5 and 70 meq/100 g, even more preferably between 10 and 60 meq/100 g. If the smectite is montmorillonite, for example, the cation exchange capacity is usually between about 80 and 150 meq/100 g, but partial immobilization will reduce it to between 5 and 70 meq/100 g. The cation exchange capacity of the smectite with partially immobilized lithium may be less than 60 meq/100 g or may even be 50 meq/100 g or less. For example, the cation exchange capacity of the smectite with partially immobilized lithium may be 1 meq/100 g or more and less than 60 meq/100 g, may be 5 meq/100 g or more and less than 60 meq/100 g, or may be 10 meg/100 g or more and less than 60 meq/100 g.

The cation exchange capacity of a smectite can be measured by a method based on Schollenberger's process (the Third Edition of the Handbook of Clays and Clay Minerals, edited by the Clay Science Society of Japan, May 2009, pp. 453-454). More specifically, it can be measured by the method set forth in Japan Bentonite Association Standard test method JBAS-106-77.

The cation leaching from a smectite can be calculated by leaching interlayer cations in the smectite using 100 mL of 1 M aqueous solution of ammonium acetate per 0.5 g of smectite over at least 4 hours and measuring the concentrations of cations in the resulting solution, for example by ICP emission spectrometry or atomic absorption spectrometry.

The amount of the smectite with partially immobilized lithium is preferably 3% by mass or more of the total nonvolatile content of the resin composition. If the amount of the smectite with partially immobilized lithium is 3% by mass or more of the total nonvolatile content, the resin composition is even better in water vapor and oxygen barrier properties (e.g., oxygen barrier properties under high-humidity conditions). In the same light, the amount of the smectite with partially immobilized lithium may be 5% by mass or more, 7% by mass or more, 9% by mass or more, 10% by mass or more, 15% by mass or more, 18% by mass or more, 20% by mass or more, 25% by mass or more, or 30% by mass or more of the total nonvolatile content of the resin composition. The amount of the smectite with partially immobilized lithium is preferably 70% by mass or less of the total nonvolatile content of the resin composition. If the amount of the smectite with partially immobilized lithium is 70% by mass or less, the resin composition is even better in formability and is improved in adhesion to a substrate. The oxygen barrier properties under high-humidity conditions also become higher. In the same light, the amount of the smectite with partially immobilized lithium may be 50% by mass or less, 45% by mass or less, 40% by mass or less, 35% by mass or less, or 30% by mass or less of the total nonvolatile content of the resin composition. These upper and lower limits can be paired in any combination. That is, the amount of the smectite with partially immobilized lithium may be, for example, between 3% and 70% by mass, between 3% and 50% by mass, between 3% and 35% by mass, between 5% and 35% by mass, between 5% and 30% by mass, between 7% and 30% by mass, between 9% and 30% by mass, or between 10% and 30% by mass of the total nonvolatile content of the resin composition. In similar statements herein, too, the specified upper and lower limits can be paired in any combination. The nonvolatile content is defined as the mass that is left after subtracting the mass of diluents and the mass of volatile components in the vinyl polymer, in modifiers, and in additives from the total mass of the resin composition.

(Vinyl Polymer)

A resin composition according an embodiment contains a vinyl polymer. A vinyl polymer is a polymer or copolymer of a vinyl monomer. The polystyrene-equivalent weight-average molecular weight as measured by GPC (gel permeation chromatography) is not critical, but preferably is between 500 and 1000000. The vinyl monomer only needs to have at least one vinyl group. Besides monomers having a vinyl group, vinyl monomers include monomers that have a (meth)allyl group or (meth)acryloyl group. (Meth)allyl group refers to an allyl or methallyl group. (Meth)acryloyl group refers to an acryloyl or methacryloyl group.

Examples of vinyl monomers include olefins, such as ethylene, propylene, isobutylene, butadiene, and isoprene; halogenated olefins, such as dichloroethylene and vinyl chloride; (meth)acrylic acid; (meth)acrylates; vinyl esters; maleic acid diesters; fumaric acid diesters; itaconic acid diesters; (meth)acrylamides; styrene and its derivatives; vinyl ethers; vinyl ketones; maleimides; allyl compounds; (meth)acrylonitrile; compounds having a vinyl-substituted heterocyclic group, such as vinylpyridine, N-vinylpyrrolidone, vinylcarbazole, N-vinylimidazole, and vinylcaprolactone; and vinyl amides, such as N-vinylformamide and N-vinylacetamide.

Examples of (meth)acrylates include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth) acrylate, t-butyl-cyclohexyl (meth) acrylate, 2-ethylhexyl (meth)acrylate, t-octyl (meth)acrylate, dodecyl (meth)acrylate, octadecyl (meth) acrylate, acetoxyethyl (meth) acrylate, phenyl (meth) acrylate, 2-hydroxyethyl (meth) acrylate, 2-hydroxypropyl-(meth)acrylate, 3-hydroxypropyl-(meth)acrylate, 4-hydroxybutyl-(meth)acrylate, 2-methoxyethyl (meth) acrylate, 2-ethoxyethyl (meth) acrylate, 2-(2-methoxyethoxy)ethyl (meth) acrylate, 3-phenoxy-2-hydroxypropyl (meth)acrylate, 2-chloroethyl-(meth)acrylate, glycidyl (meth) acrylate, 3,4-epoxycyclohexylmethyl-(meth)acrylate, vinyl (meth)acrylate, 2-phenylvinyl-(meth)acrylate, 1-propenyl-(meth)acrylate, allyl (meth)acrylate, 2-allyloxyethyl-(meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth) acrylate, nonylphenoxypolyethylene glycol (meth) acrylate, dicyclopentenyl (meth) acrylate, dicyclopentenyloxyethyl (meth) acrylate, trifluoroethyl (meth) acrylate, octafluoropentyl (meth) acrylate, perfluorooctylethyl (meth) acrylate, dicyclopentanyl (meth) acrylate, tribromophenyl (meth) acrylate, tribromophenyloxyethyl (meth) acrylate, and γ-butyrolactone-(meth)acrylate.

Examples of vinyl esters include vinyl acetate, vinyl chloroacetate, vinyl propionate, vinyl butyrate, vinyl methoxyacetate, and vinyl benzoate.

Examples of maleic acid diesters include dimethyl maleate, diethyl maleate, and dibutyl maleate.

Examples of fumaric acid diesters include dimethyl fumarate, diethyl fumarate, and dibutyl fumarate.

Examples of itaconic acid diesters include dimethyl itaconate, diethyl itaconate, and dibutyl itaconate.

Examples of (meth)acrylamides include (meth)acrylamide, N-methyl(meth)acrylamide, N-ethyl(meth)acrylamide, N-propyl(meth)acrylamide, N-isopropyl(meth)acrylamide, N-n-butyl (meth)acrylamide, N-t-butyl(meth)acrylamide, N-cyclohexyl(meth)acrylamide, N-(2-methoxyethyl) (meth) acrylamide, N,N-dimethyl(meth)acrylamide, N,N-diethyl (meth)acrylamide, N-phenyl(meth)acrylamide, N-nitrophenylacrylamide, N-ethyl-N-phenylacrylamide, N-benzyl (meth)acrylamide, (meth)acryloylmorpholine, diacetoneacrylamide, N-methylolacrylamide, N-hydroxyethylacrylamide, vinyl(meth)acrylamide, N,N-diallyl(meth) acrylamide, and N-allyl(meth)acrylamide.

Examples of styrene derivatives include methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, and α-methylstyrene.

Examples of vinyl ethers include methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, and phenyl vinyl ether.

Examples of vinyl ketones include methyl vinyl ketone, ethyl vinyl ketone, propyl vinyl ketone, and phenyl vinyl ketone.

Examples of maleimides include maleimide, butylmaleimide, cyclohexylmaleimide, and phenylmaleimide.

Examples of allyl compounds include allyl acetate, allyl alcohol, allylamine, N-allylaniline, allyl chloride, and allyl bromide.

The vinyl polymer may include at least one hydrophilic functional group selected from a hydroxyl group and a carboxyl group so that it will be further improved in compatibility with the smectite with partially immobilized lithium. The vinyl polymer preferably has at least one of a hydroxyl group and a carboxyl group but may have both a hydroxyl group and a carboxyl group. The hydrophilic functional group is preferably a hydroxyl group.

Polymerizing a vinyl monomer having a hydrophilic functional group gives a vinyl polymer having a hydrophilic functional group introduced thereto. If the hydrophilic functional group is a hydroxyl group, polymerizing an ester compound of an alcohol having a polymerizable double bond followed by saponification also results in the introduction of a hydroxyl group as a hydrophilic functional group.

The vinyl monomer having a hydrophilic functional group can be a known and commonly used monomer. For example, if the hydrophilic functional group is a hydroxyl group, the vinyl monomer having a hydroxyl group (hydroxyl-containing monomer) can be a hydroxyl-containing vinyl monomer such as (meth)allyl alcohol or vinyl alcohol; a C4-12 alkenemonool or alkenediol, such as 1-buten-3-ol; an alkenyl ether having a terminal polymerizable double bond, such as 2-hydroxyethyl propenyl ether; hydroxystyrene; hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, or 4-hydroxybutyl (meth)acrylate; or a monoester derived from a compound resulting from ring-opening polymerization of ε-caprolactone and (meth)acrylic acid.

If the hydrophilic functional group is a carboxylic group, polymerizing a vinyl monomer having a carboxyl group, for example, gives a vinyl polymer having a carboxylic group introduced thereto. Polymerizing a vinyl monomer having a hydroxyl group followed by dehydration condensation with a polyfunctional carboxylic acid or its anhydride also results in the introduction of a carboxyl group.

Examples of vinyl monomers having a carboxyl group (carboxyl-containing monomers) include carboxyl-containing vinyl monomers such as (meth)acrylic acid, allyloxyacetic acid, 2-(meth)acryloylpropanoic acid, 3-(meth)acryloylbutanoic acid, and 4-vinylbenzoic acid.

The quantity of the hydrophilic functional group in the vinyl polymer is not critical. For example, the vinyl polymer contains the hydrophilic functional group preferably in such a quantity that the total of the hydroxyl and acid values of the vinyl polymer falls within the range of 1 to 2000 mg KOH/g. The total of the hydroxyl and acid values of the vinyl polymer is more preferably between 300 and 1500 mg KOH/g, even more preferably between 600 and 1200 mg KOH/g. The hydroxyl value can be measured by the measuring method for hydroxyl value set forth in JIS-K0070, and the acid value by the measuring method for acid value set forth in JIS-K0070. If a synthesized vinyl polymer is used, the total of hydroxyl and acid values can also be calculated from the monomer composition used.

The vinyl polymer is preferably a vinyl polymer having a structural unit A (also referred to as a substructure A), represented by formula (1) below (Hereinafter such a vinyl polymer is also referred to as a "vinyl polymer A."). In this case, the resin composition exhibits even higher gas barrier properties because the vinyl polymer A is highly compatible with the smectite with partially immobilized lithium by virtue of having a hydrophilic functional group ($Q^1$). Moreover, the R in the structural unit A of the vinyl polymer A gives the resin composition waterproofness. An improvement is therefore expected in water vapor barrier properties and in oxygen barrier properties under high-humidity conditions.

[Chem. 2]

In formula (1), R represents a C1-2 alkyl group, $Q^1$ represents a hydroxyl or carboxyl group, m represents 0 or 1, and * represents a bond.

R is specifically a methyl or ethyl group, preferably a methyl group (C1 alkyl group). $Q^1$ is preferably a hydroxyl group. m is preferably 0.

The quantity of structural units A is preferably 1 mol % or more, more preferably 5 mol % or more, even more preferably 10 mol % or more, in particular 30 mol % or more, 50 mol % or more, or 65 mol % or more, the most preferably 75 mol % or more of the total molar quantity of hydrophilic functional groups in the vinyl polymer (total molar quantity of hydroxyl and carboxyl groups; the same applies hereinafter) so that the resin composition will be superior in waterproofness. The quantity of structural units A is preferably 99 mol % or less, more preferably 95 mol % or less, even more preferably 90 mol % or less of the total molar quantity of hydrophilic functional groups in the vinyl polymer so that the resin composition will be superior in film formation when molded into an article, the strength of films made from the composition, adhesiveness as a composition, etc. The quantity of structural units A is preferably 1 mol % or more and 99 mol % or less, more preferably 5 mol % or more and 95 mol % or less, even more preferably 10 mol % or more and 90 mol % or less, in particular 30 mol % or more and 90 mol % or less of the total molar quantity of hydrophilic functional groups in the vinyl polymer. It is preferred that the quantity of structural units A in which R is a methyl group fall within these ranges, it is preferred that the quantity of structural units A in which $Q^1$ is a hydroxyl group fall within these ranges, it is preferred that the quantity of structural units A in which m is 0 fall within these ranges, and it is more preferred that the quantity of the structural unit A in which R is a methyl group, $Q^1$ is a hydroxyl group, and m is 0 fall within these ranges.

The vinyl polymer may include a structural unit that has a hydrophilic functional group and is not a structural unit A (hydrophilic structural unit). The hydrophilic structural unit may be, for example, a structural unit B (also referred to as a substructure B), represented by formula (2) below. The vinyl polymer preferably includes a structural unit B besides a structural unit A. In an embodiment, the vinyl polymer may be formed exclusively by structural units each of which is a structural unit A or B. When the vinyl polymer contains a structural unit B, a further improvement is achieved in film formation when the resin composition is molded into an article, the strength of films made from the composition, and the adhesiveness of the resin composition.

[Chem. 3]

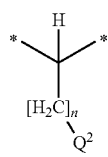

(2)

In formula (2), $Q^2$ represents a hydroxyl or carboxyl group, n represents 0 or 1, and * represents a bond. $Q^2$ is preferably a hydroxyl group. n is preferably 0.

If the vinyl polymer includes a structural unit B, the quantity of the structural unit B is preferably 1 mol % or more, more preferably 5 mol % or more, even more preferably 10 mol % or more and is preferably 99 mol % or less, more preferably 95 mol % or less, even more preferably 90 mol % or less, in particular 60 mol % or less of the total molar quantity of hydrophilic functional groups in the vinyl polymer. The quantity of the structural unit B is preferably 5 mol % or more and 95 mol % or less, more preferably 10 mol % or more and 90 mol % or less, even more preferably 10 mol % or more and 60 mol % or less of the total molar quantity of hydrophilic functional groups in the vinyl polymer. It is preferred that the quantity of structural units B in which $Q^2$ is a hydroxyl group fall within these ranges, it is preferred that the quantity of structural units B in which n is 0 fall within these ranges, and it is more preferred that the amount of structural units B in which $Q^2$ is a hydroxyl group, and n is 0 fall within these ranges.

If the vinyl polymer includes structural units A and B, the quantity of structural units A in mol % based on the total quantity of structural units A and B ($A/(A+B)\times100$) may be 1 mol % or more, 5 mol % or more, 10 mol % or more, 30 mol % or more, 50 mol % or more, 65 mol % or more, or 75 mol % or more and may be 99 mol % or less, 95 mol % or less, or 90 mol % or less because this further improves gas barrier properties.

It is not critical how to produce a vinyl polymer having a structural unit A and/or a structural unit B; it can be produced by a known and commonly used method. For example, if the hydrophilic functional group in a structural unit A or B ($Q^1$ or $Q^2$) is a hydroxyl group, polymerizing an ester derived from the hydroxyl-containing vinyl monomer corresponding to the structural unit A or B followed by saponification, for example, gives a vinyl polymer that has a hydroxyl group as its hydrophilic functional group.

Examples of hydroxyl-containing vinyl monomers corresponding to structural units A include isopropenyl alcohol, methallyl alcohol, and isobutenyl alcohol. The ester as in ester derived from a hydroxyl-containing vinyl monomer corresponding to a structural unit A can be an ester of, for example, acetic acid, propanoic acid, butanoic acid, 2-methylpropanoic, pentanoic acid, 3-methylbutanoic acid, 2,2-dimethylpropanoic acid, hexanoic acid, cyclohexylcarboxylic acid, or benzoic acid. Among esters derived from a hydroxyl-containing vinyl monomer corresponding to a structural unit A, it is particularly preferred that the ester be any of isopropenyl acetate, methallyl acetate, and isobutenyl acetate, which are esters of acetic acid. One of these may be used alone, or two or more may be used in combination.

Examples of hydroxyl-containing vinyl monomers corresponding to structural units B include vinyl alcohol, allyl alcohol, and crotyl alcohol. The ester as in ester derived from a hydroxyl-containing vinyl monomer corresponding to a structural unit B can be an ester as named above. Among esters derived from a hydroxyl-containing vinyl monomer corresponding to a structural unit B, it is particularly preferred that the ester be any of vinyl acetate, allyl acetate, and crotyl acetate, which are esters of acetic acid. One of these may be used alone, or two or more may be used in combination.

If the hydrophilic functional group in a structural unit A or B ($Q^1$ or $Q^2$) is a carboxyl group, polymerizing a carboxyl-containing vinyl monomer corresponding to the structural unit A or B gives a vinyl polymer that has a carboxyl group as its hydrophilic functional group. Examples of carboxyl-containing vinyl monomers corresponding to structural units A include methacrylic acid and 3-methyl-3-butenoic acid.

Examples of carboxyl-containing vinyl monomers corresponding to structural units B include acrylic acid and 3-butenoic acid.

The vinyl polymer may be a homopolymer, obtained by polymerizing a single kind of monomer, and it is also acceptable for the vinyl polymer to be a copolymer, obtained by copolymerizing multiple kinds of monomers. In this case, it is acceptable to use, as the vinyl monomers, a combination of a monomer having a vinyl group, another having a (meth)allyl group, and another having a (meth)acryloyl group.

The vinyl polymer is obtained by polymerizing vinyl monomer(s), for example by radical polymerization, anionic polymerization, or cationic polymerization. The polymerization may be performed using a polymerization initiator. The polymerization initiator can be, for example, a thermal radical polymerization initiator, radical photoinitiator, anionic polymerization initiator, or cationic polymerization initiator.

Examples of thermal radical polymerization initiators include peroxides, such as t-butyl peroxybenzoate, di-t-butyl peroxide, cumene perhydroxide, acetyl peroxide, benzoyl peroxide, and lauroyl peroxide; and azo compounds, such as azobisisobutyronitrile, azobis-2,4-dimethylvaleronitrile, and azobiscyclohexanecarbonitrile. Examples of radical photoinitiators include 1-hydroxy-cyclohexyl-phenyl-ketone, 2-hydroxy-2-methyl-1-phenyl-propan-1-one, 2,2-dimethoxy-1,2-diphenylethan-1-one, 2-methyl-1-(4-methylthiophenyl)-2-morpholinopropan-1-one, and 2,4,6-trimethylbenzoyl-diphenyl-phosphine oxide.

Examples of anionic polymerization initiators include organic alkali metals, such as methyllithium, n-butyllithium, sec-butyllithium, and t-butyllithium; organic alkaline earth metals, such as methylmagnesium chloride and methylmagnesium bromide; and alkali metals, such as lithium, sodium, and potassium.

Examples of cationic polymerization initiators include protonic acids, such as hydrochloric acid, sulfuric acid, perchloric acid, trifluoroacetic acid, methanesulfonic acid, trifluoromethanesulfonic acid, chlorosulfonic acid, and fluorosulfonic acid; and Lewis acids, such as boron trifluoride, titanium tetrachloride, stannic chloride, and ferric chloride.

In an embodiment, one vinyl polymer may be used alone, or multiple vinyl polymers used in combination. A vinyl polymer may be a linear polymer or may be a branched polymer. A branched vinyl polymer may be comb-shaped or may be star-shaped.

The amount of the vinyl polymer may be between 50% and 97% by mass, may be between 70% and 93% by mass, or may be between 80% and 95% by mass of the total nonvolatile content of the resin composition. An amount of the vinyl polymer equal to or higher than 50% by mass results in even better water vapor and oxygen barrier properties. An amount of the vinyl polymer equal to or lower than 97% by mass results in even better formability of the resin composition.

The resin composition may be one obtained by synthesizing a vinyl polymer and mixing the synthesized vinyl polymer with a smectite with partially immobilized lithium or may be one obtained by blending vinyl monomer(s) and a smectite with partially immobilized lithium and then polymerizing the vinyl monomer(s). In any case, a polymerization initiator as described above may be used.

(Other Ingredients)

The resin composition may further contain a modifier. Examples of modifiers include a coupling agent, a silane compound, and an acid anhydride. If the resin composition contains any such modifier, the smectite with partially immobilized lithium is improved in wettability and therefore in dispersibility in the resin composition. One modifier may be used alone, or multiple modifiers may be used in combination.

Examples of coupling agents include silane coupling agents, titanium coupling agents, zirconium coupling agents, and aluminum coupling agents.

Examples of silane coupling agents include epoxy-containing silane coupling agents, amino-containing silane coupling agents, (meth)acryl-containing silane coupling agents, and isocyanate-containing silane coupling agents. Examples of epoxy-containing silane coupling agents include 3-glycidoxypropyltrimethoxysilane, 3-glycidoxypropyltriethoxysilane, 3-glycidoxypropylmethyldiethoxysilane, and 2-(3,4 epoxycyclohexyl)ethyltrimethoxysilane. Examples of amino-containing silane coupling agents include 3-aminopropyltrimethoxysilane, N-2-(aminoethyl)-3-aminopropylmethyldimethoxysilane, 3-triethoxysilyl-N-(1,3-dimethyl-butylidene)propylamine, and N-phenyl-γ-aminopropyltrimethoxysilane. Examples of (meth)acryl-containing silane coupling agents include 3-acryloxypropyltrimethoxysilane, 3-methacryloxypropyltrimethoxysilane, and 3-methacryloxypropyltriethoxysilane. An example of an isocyanate-containing silane coupling agent is 3-isocyanatopropyltriethoxysilane.

Examples of titanium coupling agents include isopropyl triisostearoyl titanate, isopropyl trioctanoyl titanate, isopropyl dimethacrylisostearoyl titanate, isopropyl isostearoyl diacryltitanate, isopropyl tris(dioctyl pyrophosphate) titanate, tetraoctyl bis(ditridecyl phosphite)titanate, tetra(2,2-diallyloxymethyl-1-butyl) bis(ditridecyl)phosphite titanate, bis(dioctyl pyrophosphate)oxyacetate titanate, and bis(dioctyl pyrophosphate)ethylene titanate.

Examples of zirconium coupling agents include zirconium acetate, ammonium zirconium carbonate, and zirconium fluoride.

Examples of aluminum coupling agents include acetalkoxyaluminum diisopropylate, aluminum diisopropoxymonoethylacetoacetate, aluminum tris ethylacetoacetate, and aluminum tris acetylacetonate.

Examples of silane compounds include alkoxysilanes, silazanes, and siloxanes. Examples of alkoxysilanes include methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, and 1,6-bis(trimethoxysilyl)hexane, trifluoropropyltrimethoxysilane. An example of a silazane is hexamethyldisilazane. An example of a siloxane is a siloxane that contains a hydrolyzable group.

Examples of acid anhydrides include succinic anhydride, maleic anhydride, phthalic anhydride, trimellitic anhydride, pyromellitic anhydride, tetrahydrophthalic anhydride, methyltetrahydrophthalic anhydride, methylnadic anhydride, hexahydrophthalic anhydride, methylhexahydrophthalic anhydride, and alkenylsuccinic anhydrides.

The modifier loading is preferably between 0.1% and 50% by mass of the whole amount of the smectite with partially immobilized lithium. A modifier loading equal to or higher than 0.1% by mass results in better dispersibility of the smectite with partially immobilized lithium in the resin composition. A modifier loading equal to or lower than 50% by mass results in reduced impact of the modifier(s) on the mechanical characteristics of the resin composition. The modifier loading is preferably between 0.3% and 30% by mass, more preferably between 0.5% and 15% by mass.

The resin composition may contain a solvent, depending on its purpose of use. The solvent can be an organic solvent for example, such as methyl ethyl ketone, acetone, ethyl acetate, butyl acetate, toluene, dimethylformamide, acetonitrile, methyl isobutyl ketone, methanol, ethanol, propanol, methoxypropanol, cyclohexanone, methyl cellosolve, ethyl diglycol acetate, or propylene glycol monomethyl ether acetate. The solvent and its quantity can be selected as appropriate for the purpose of use.

The resin composition may contain additives (excluding compounds that meet the definition of a vinyl polymer, a smectite with partially immobilized lithium, a modifier, or a solvent) unless the advantages of the present invention are lost. Examples of additives include organic fillers, inorganic fillers, stabilizers (antioxidant, heat stabilizer, ultraviolet absorber, etc.), plasticizers, antistatic agents, lubricants, anti-blocking agents, coloring agents, nucleators, oxygen scavengers (compounds capable of trapping oxygen), and tackifiers. These additives are used alone, or two or more are used in combination.

Inorganic fillers as a type of additive include inorganic substances, such as metals, metal oxides, resins, and minerals, and composites thereof. Specific examples of inorganic fillers include silica, alumina, titanium, zirconia, copper, iron, silver, mica, talc, aluminum flakes, glass flakes, and clay minerals. Among these, it is particularly preferred to use a clay mineral for the purpose of improving gas barrier properties. Among clay minerals, the use of a swellable inorganic layer compound in particular is more preferred.

Examples of swellable inorganic layer compounds include silicate hydrates (e.g., phyllosilicate minerals), kaolinite clay minerals (e.g., halloysite), smectite clay minerals (e.g., montmorillonite, beidellite, nontronite, saponite, hectorite, sauconite, and stevensite), and vermiculite clay minerals (e.g., vermiculite). These minerals may be natural or synthesized clay minerals.

Examples of compounds capable of trapping oxygen include low-molecular-weight organic compounds that react with oxygen, such as hindered phenolic compounds, vitamin C, vitamin E, organic phosphorus compounds, gallic acid, and pyrogallol, and compounds of transition metals, such as cobalt, manganese, nickel, iron, and copper.

Examples of tackifiers include xylene resins, terpene resins, phenolic resins, and rosin resins. Adding a tackifier helps improve adhesion to film materials upon application. The amount of tackifier added is preferably between 0.01 and 5 parts by mass based on the whole amount of the resin composition as 100 parts by mass.

<Molded Article>

A molded article according to an embodiment can be obtained by molding a resin composition as described above. The molded article may be from the resin composition or may be from the cured form of the resin composition. The molding method is at the manufacturer's discretion and can be selected in accordance with the purpose of use when appropriate. The molded article can be in any shape; it may be shaped like a plate, sheet, or film, may have a three-dimensional shape, may be a coating on a substrate, or may be one molded to be present between a substrate and a substrate.

If a plate- or sheet-shaped article is fabricated, possible methods include methods in which the resin composition is molded, for example using extrusion molding, flat stamping, profile extrusion molding, blow molding, compression molding, vacuum molding, or injection molding. If a film-shaped article is fabricated, examples of possible methods include hot melt extrusion, polymer solution casting, inflation film molding, cast molding, extrusion laminating, calendar molding, sheet forming, fiber molding, blow molding, injection molding, rotational molding, and coating. If the resin composition is one that cures when exposed to heat or active energy radiation, the resin composition may be molded using curing methods in which heat or active energy radiation is employed.

If the resin composition is liquid, it may be molded by coating. Examples of possible coating methods include spraying, spin coating, dipping, roll coating, blade coating, doctor roll coating, doctor blading, curtain coating, slit coating, screen printing, inkjet coating, and dispensing.

<Laminate>

A laminate according to an embodiment is one that includes a substrate and a molded article as described above on the substrate. The laminate may have a two-layer structure, a three-layer structure, or have more layers.

The material for the substrate is not critical and can be selected as appropriate for the purpose of use. The substrate can be made of, for example, wood, metal, plastic, paper, silicone, or a modified silicone or may be a substrate obtained by joining different materials together. The substrate can be in any shape; it may be shaped like a flat plate, a sheet, a three-dimensional shape having curvature throughout or in part of it, or any other shape selected in accordance with the purpose. The hardness, thickness, etc., of the substrate are not critical either.

The laminate can be obtained by laminating the substrate with a molded article as described above. The molded article with which the substrate is laminated may be formed by directly coating the substrate with the resin composition or molding the resin composition directly on the substrate, or an article molded from the resin composition may be placed. For direct coating, the coating method is not critical, and examples of possible methods include spraying, spin coating, dipping, roll coating, blade coating, doctor roll coating, doctor blading, curtain coating, slit coating, screen printing, or inkjet coating. For direct molding, examples of possible molding methods include in-mold forming, film insert molding, vacuum molding, extrusion laminating, and stamping. If an article molded from the cured form of the resin composition is placed, a layer of uncured or partially cured resin composition may be placed on the substrate and then cured, or a layer of completely cured resin composition may be placed on the substrate.

Alternatively, the laminate may be obtained by coating cured resin composition with a precursor to the substrate and then curing the precursor or may be obtained by bonding together a precursor to the substrate and the resin composition with one of them uncured or partially cured and then curing the uncured or partially cured member. The precursor to the substrate can be any substance, and examples include curable resin compositions. The laminate may be prepared by using a resin composition according to an embodiment as an adhesive.

<Gas Barrier Material>

The resin composition is suitable for use as a gas barrier material by virtue of being superior in water vapor and oxygen barrier properties. The gas barrier material only needs to be one that contains a resin composition as described above.

<Coating Material>

The resin composition is suitable for use as a coating material. The coating material only needs to be one that contains a resin composition as described above. The method of coating with the coating material is not critical. Examples of specific methods include coating methods such as roll coating and gravure coating. The coater is not critical either. By virtue of having high gas barrier properties, the resin composition can be suitably used as a coating material for gas barrier purposes.

<Adhesive>

The resin composition is suitable for use as an adhesive by virtue of being superior in adhesiveness. The adhesive can be in any form; it may be a liquid or paste adhesive or may be a solid adhesive. By virtue of having high gas barrier properties, the resin composition can be suitably used as an adhesive for gas barrier purposes.

In the case of a liquid or paste adhesive, it is not critical how it is used, but the user may apply it to the surface to be bonded or pour it between the surfaces to be bonded, join the members together, and cure the adhesive.

In the case of a solid adhesive, the user may place a powder, chip, or sheet shaped from the adhesive between the surfaces to be bonded, join the surfaces together by thermally melting the adhesive, and cure the adhesive.

EXAMPLES

The following describes the present invention in further detail by examples, but the present invention is not limited to these.

The filler to be contained in the resin composition was a smectite with partially immobilized lithium or a smectite without partially immobilized lithium. The smectite with partially immobilized lithium was a dispersion slurry of montmorillonite available from Kunimine Industries Co., Ltd. (trade name, RCEC-W; cation exchange capacity, 39.0 meq/100 g). The amount (w/w %) of the smectite with partially immobilized lithium in this dispersion slurry was 20 w/w %. The smectite without partially immobilized lithium was natural montmorillonite (trade name, KUNIPIA-F; cation exchange capacity, 108 meq/100 g; Kunimine Industries Co., Ltd.; KUNIPIA is a registered trademark).

The modifier was 3-methacryloylpropyltrimethoxysilan "KBM503," a silane coupling agent available from Shin-Etsu Chemical Co., Ltd. The modifier solution was prepared by mixing materials in a ratio by parts by mass of KBM503:water:2-propanol:0.1 mol/1 hydrochloric acid=2.4:0.5:32:1 and stirring the mixture for 2 hours.

Preparation of Vinyl Polymers

Production Example 1

A stainless steel flask equipped with a stirrer, a thermometer, a condenser, and a dripper was charged with 51.6 parts by mass of vinyl acetate, 140 parts by mass of isopropenyl acetate, and 4.32 parts by mass of PERBUTYL® 0 as an initiator. The materials were stirred under a stream of nitrogen and heated to 75° C. After 30 hours of stirring, the temperature was reduced to 50° C., then 450 parts by mass of methanol was added, and the mixture was stirred at 50° C. A solution of 15 g of sodium hydroxide and 80 g of methanol was added dropwise, and the mixture was stirred for 5 hours for saponification. The product was then cooled to room temperature, washed with water, and then dried in a vacuum, giving a vinyl polymer that included a structural unit derived from isopropenyl alcohol (structural unit A in which R was a methyl group, $Q^1$ was a hydroxyl group, and m was 0) and a structural unit derived from vinyl alcohol (structural unit B in which $Q^2$ was a hydroxyl group, and n was 0) as vinyl polymer 1. The molar ratio of structural units A to structural units B (A/B) was 7/3. That is, the quantity of structural units A was 70 mol %, and that of structural units B was 30 mol % of the total molar quantity of hydrophilic functional groups (hydroxyl group) in the vinyl polymer.

Production Example 2

A stainless steel flask equipped with a stirrer, a thermometer, a condenser, and a dripper was charged with 34.4 parts by mass of vinyl acetate, 160 parts by mass of isopropenyl acetate, and 4.37 parts by mass of PERBUTYL® 0 as an initiator. The materials were stirred under a stream of nitrogen and heated to 75° C. After 30 hours of stirring, the temperature was reduced to 50° C., then 450 parts by mass of methanol was added, and the mixture was stirred at 50° C. A solution of 15 g of sodium hydroxide and 80 g of methanol was added dropwise, and the mixture was stirred for 5 hours for saponification. The product was then cooled to room temperature, washed with water, and then dried in a vacuum, giving a vinyl polymer that included a structural unit derived from isopropenyl alcohol (structural unit A in which R was a methyl group, $Q^1$ was a hydroxyl group, and m was 0) and a structural unit derived respectively from vinyl alcohol (structural unit B in which $Q^2$ was a hydroxyl group, and n was 0) as vinyl polymer 2. The molar ratio of structural units A to structural units B (A/B) was 8/2. That is, the quantity of structural units A was 80 mol %, and that of structural units B was 20 mol % of the total molar quantity of hydrophilic functional groups (hydroxyl group) in the vinyl polymer.

A polyacrylic acid available from Wako Pure Chemical Industries, Ltd. (molecular weight, 25000) was used as vinyl polymer 3. The vinyl polymer contained 100 mol % structural units B based on the total molar quantity of hydrophilic functional group (carboxyl group) therein.

Production Example 3

A stainless steel flask equipped with a stirrer, a thermometer, a condenser, and a dripper was charged with 1042 parts by mass of methyl ethyl ketone as a solvent, and the solvent was heated to 80° C. under a stream of nitrogen. To the heated solvent, 200 parts by mass of acrylic acid, 300 parts by mass of methyl methacrylate, and 125 parts by mass of PERBUTYL® 0 as an initiator were added dropwise. After 20 hours of stirring under reflux, 2.5 parts by mass of PERBUTYL® 0 was added as an initiator, and the mixture was stirred under reflux for 5 hours. The product was then cooled to room temperature, purified, and then dried in a vacuum, giving a desired copolymer of acrylic acid and methyl methacrylate (vinyl polymer 4). The vinyl polymer contained 100 mol % structural units B based on the total molar quantity of hydrophilic functional groups (carboxyl group) therein.

Production Example 4

A stainless steel flask equipped with a stirrer, a thermometer, a condenser, and a dripper was charged with 1042 parts by mass of methyl ethyl ketone as a solvent, and the solvent was heated to 80° C. under a stream of nitrogen. To the heated solvent, 500 parts by mass of methyl methacrylate and 125 parts by mass of PERBUTYL® O as an initiator were added dropwise. After 20 hours of stirring under reflux, 2.5 parts by mass of PERBUTYL® O was added as an initiator, and the mixture was stirred under reflux for 5 hours. The product was then cooled to room temperature, purified, and then dried in a vacuum, giving a desired polymethyl methacrylate (vinyl polymer 5).

Preparation of Test Film Laminates

Example 1

To 100 parts by mass of the vinyl polymer obtained in Production Example 1, 110 parts by mass of the aforementioned RCEC-W, 110 parts by mass of acetonitrile, 266 parts by mass of ethanol, and 35.9 parts by mass of the modifier solution were added. The materials were kept under stirring for 18 hours. In this way, a resin composition of Example 1 was obtained. This resin composition was named liquid coating 1.

The corona-treated surface of "E5100 #12," a PET film available from Toyobo Co., Ltd., was coated with liquid coating 1 using a #10 bar coater. Shortly after coating, the coated PET film was heated in a drying oven at 80° C. for 30 seconds. The film was then heated in a drying oven at 130° C. for 2 hours. In this way, an article molded from a resin composition was formed on the PET film, giving a film laminate of Example 1.

In the resin composition of Example 1 and the article molded therefrom, the amount of the smectite with partially immobilized lithium (filler content) was 18% by mass of the total nonvolatile content, and the modifier loading (modifier content) was 11% by mass of the whole amount of the smectite with partially immobilized lithium.

Examples 2 to 10 and Comparative Examples 1 and 2

Resin compositions, whose formula was as given in Table 1 or 2 (unit: parts by mass), were obtained as in Example 1. Articles molded from resin compositions were formed on PET films as in Example 1 except that liquid coating 1 was replaced with the resulting liquid coatings. In this way, film laminates of Examples 2 to 10 and Comparative Examples 1 and 2 were obtained.

For the resin compositions of Examples 2 to 10 and Comparative Examples 1 and 2 and the articles molded therefrom, the filler content (amount of the smectite with partially immobilized lithium or natural montmorillonite) based on the total nonvolatile content was as given in Table 1 or 2.

For the resin compositions of the Examples and Comparative Examples, the quantity of hydrophilic functional groups in the vinyl polymer (total of the hydroxyl and acid values) was as given in Table 1 or 2.

<Testing>

The film laminates of the Examples and Comparative Examples were tested for film formation, oxygen permeability, and water vapor permeability. The test results are presented in Tables 1 and 2. The tests for film formation, oxygen permeability, and water vapor permeability were performed as follows.

(Measurement of Oxygen Permeability)

The measurement of oxygen permeability was conducted in an atmosphere at a temperature of 23° C. and a humidity of 90% RH using MOCON OX-IRAN 1/50 oxygen transmission rate test system in accordance with JIS-K7126 (equal-pressure method). RH stands for relative humidity.

(Measurement of Water Vapor Permeability)

The measurement of water vapor permeability was conducted in an atmosphere at a temperature of 40° C. and a humidity of 90% RH using in accordance with JIS-Z 0208 (dish method), with the PET film of the coated films obtained in the Examples on the high-humidity side.

(Film Formation)

Film formation was graded "A" if the coated surface of the film laminate was smooth or "B" if the coated surface was not smooth.

TABLE 1

| | | | Example 1 | Example 2 | Example 3 | Example 4 | Example 5 | Example 6 |
|---|---|---|---|---|---|---|---|---|
| Formula | Vinyl polymers | Vinyl polymer 1 | 100 | — | — | — | — | — |
| | | Vinyl polymer 2 | — | 100 | — | — | — | — |
| | | Vinyl polymer 3 | — | — | 100 | 100 | 100 | 100 |
| | | Vinyl polymer 4 | — | — | — | — | — | — |
| | | Vinyl polymer 5 | — | — | — | — | — | — |
| | Fillers | RCEC-W | 110 | 110 | 27.5 | 55.0 | 110 | 367 |
| | | KUNIPIA-F | — | — | — | — | — | — |
| | Modifier solution | Silane coupling agent solution | 35.9 | 35.9 | 9.0 | 18.0 | 35.9 | 119.7 |
| | Solvents | Methanol | — | — | 375 | 325 | 266 | — |
| | | Ethanol | 266 | 266 | — | — | — | — |
| | | Acetone | — | — | — | — | — | — |
| | | Acetonitrile | 110 | 110 | 27.5 | 55.0 | 110 | 367 |
| | Filler content, % by mass (of total nonvolatile content) | | 18 | 18 | 5 | 10 | 18 | 40 |
| | Quantity of hydrophilic functional groups in the vinyl polymer (mg KOH/g) (total of hydroxyl and acid values) | | 1043 | 1016 | 779 | 779 | 779 | 779 |
| Testing | Oxygen permeability (90% RH) (cc/m² · day · atm) | | 22.9 | 5.6 | 99.9 | 92.2 | 80 | 85.5 |
| | Water vapor permeability (g/m² · day) | | 10.6 | 7.7 | 30.5 | 24.1 | 20 | 19 |
| | Film formation | | A | A | A | A | A | A |

TABLE 2

| | | | Example 7 | Example 8 | Example 9 | Example 10 | Comparative Example 1 | Comparative Example 2 |
|---|---|---|---|---|---|---|---|---|
| Formula | Vinyl polymers | Vinyl polymer 1 | — | — | — | — | — | — |
| | | Vinyl polymer 2 | — | — | — | — | — | — |
| | | Vinyl polymer 3 | 100 | — | — | — | 100 | 100 |
| | | Vinyl polymer 4 | — | 100 | — | — | — | — |
| | | Vinyl polymer 5 | — | — | 100 | 100 | — | — |
| | Fillers | RCEC-W | 1150 | 110 | 110 | 110 | — | — |
| | | KUNIPIA-F | — | — | — | — | — | 230 |
| | Modifier solution | Silane coupling agent solution | 378 | 35.9 | 35.9 | 35.9 | — | 378 |
| | Solvents | Methanol | 2000 | 266 | — | — | 400 | 2500 |
| | | Ethanol | — | — | — | — | — | — |
| | | Acetone | — | — | 266 | 266 | — | — |
| | | Acetonitrile | 1150 | 110 | 110 | 110 | — | — |
| | Filler content, % by mass (of total nonvolatile content) | | 70 | 18 | 18 | 70 | 0 | 70 |
| | Quantity of hydrophilic functional groups in the vinyl polymer (mg KOH/g) (total of hydroxyl and acid values) | | 779 | 326 | — | — | 779 | 779 |
| Testing | Oxygen permeability (90% RH) (cc/m² · day · atm) | | 100 | 82 | 87 | 108 | 130 | 120 |
| | Water vapor permeability (g/m² · day) | | 25 | 25 | 33 | 35 | 40 | 38 |
| | Film formation | | B | A | A | B | A | B |

INDUSTRIAL APPLICABILITY

The resin composition according to the present invention can be suitably used in various fields, including packaging materials and also electronic materials and building materials, by virtue of being superior in gas barrier properties, in particular water vapor and oxygen barrier properties.

The invention claimed is:

1. A resin composition comprising a vinyl polymer and a smectite with partially immobilized lithium is present in an amount of 3% to 45% by mass based on total nonvolatile content of the resin composition.

2. The resin composition according to claim 1, wherein the vinyl polymer includes at least one selected from the group consisting of a hydroxyl group and a carboxyl group.

3. The resin composition according to claim 1, wherein the vinyl polymer has a structural unit represented by formula (1):

[Chem. 1]

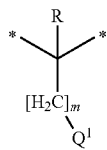

(1)

in formula (1), R represents a C1-2 alkyl group, $Q^1$ represents a hydroxyl or carboxyl group, m represents 0 or 1, and * represents a bond.

4. The resin composition according to claim 1, wherein the smectite with partially immobilized lithium has a cation exchange capacity of 1 to 70 meq/100 g.

5. A gas barrier material comprising a resin composition according to claim 1.

6. An article molded from a resin composition according to claim 1.

7. A laminate comprising a substrate and a molded article according to claim 6 on the substrate.

8. A coating material comprising a resin composition according to claim 1.

9. An adhesive comprising a resin composition according to claim 1.

10. A resin composition comprising a vinyl polymer and a smectite with partially immobilized lithium; wherein the vinyl polymer includes at least one selected from the group consisting of a hydroxyl group and a carboxyl group.

11. The resin composition according to claim 10, wherein the smectite with partially immobilized lithium has a cation exchange capacity of 1 to 70 meq/100 g.

12. The resin composition according to claim 10, wherein the smectite with partially immobilized lithium is present in an amount of 3% to 50% by mass based on total nonvolatile content of the resin composition.

13. A gas barrier material comprising a resin composition according to claim 10.

14. An article molded from a resin composition according to claim 10.

15. A laminate comprising a substrate and a molded article according to claim 14 on the substrate.

16. A coating material comprising a resin composition according to claim 10.

17. An adhesive comprising a resin composition according to claim 10.

* * * * *